United States Patent
Planeta et al.

(10) Patent No.: US 6,409,953 B1
(45) Date of Patent: *Jun. 25, 2002

(54) METHOD OF EXTRUDING PLASTIC MATERIAL IN MULTI-LAYER TUBULAR FORM

(75) Inventors: Mirek Planeta; Surendra M. Sagar, both of Mississauga (CA)

(73) Assignee: Macro Engineering & Technology Inc., Mississauga (CA)

( * ) Notice: Subject to any disclaimer, the term of this patent is extended or adjusted under 35 U.S.C. 154(b) by 59 days.

This patent is subject to a terminal disclaimer.

(21) Appl. No.: 09/586,559

(22) Filed: May 30, 2000

Related U.S. Application Data

(63) Continuation-in-part of application No. 09/082,477, filed on May 21, 1998, now Pat. No. 6,116,885.

(51) Int. Cl.⁷ .............................................. B29C 47/06
(52) U.S. Cl. ..................... 264/171.27; 264/173.12; 264/209.8; 425/133.1; 425/380; 425/462; 425/467
(58) Field of Search ............................. 425/133.1, 380, 425/462, 467; 264/171.27, 209.8, 173.12

(56) References Cited

U.S. PATENT DOCUMENTS

| | | | | |
|---|---|---|---|---|
| 4,784,594 A | * | 11/1988 | Sharps, Jr. ............... | 425/133.1 |
| 5,651,935 A | * | 7/1997 | Matsukura et al. ....... | 425/133.1 |
| 5,788,902 A | * | 8/1998 | Planeta .................. | 264/171.27 |
| 6,116,885 A | * | 9/2000 | Planeta et al. ............. | 425/380 |

* cited by examiner

Primary Examiner—James P. Mackey
Assistant Examiner—Joseph Leyson
(74) Attorney, Agent, or Firm—Robert F. Delbridge

(57) ABSTRACT

A method of extruding plastic material in multi-layer form includes: providing an extrusion die having a first body member and a second body member surrounding the first body member and forming an annular passage therebetween which communicates with an annular extrusion orifice, the body members having a series of helical grooves extending around the die and each commencing at a separate location, the separate locations being spaced around a lower portion of the first body member. A single encapsulating unit provides a flow of encapsulated plastic material comprising a first plastic material surrounded by a second plastic material at an outlet thereof. The first body member having a series of cross-holes extending from the encapsulating unit output and each communicating with a respective separate location. The feeding encapsulated plastic material is fed from the outlet of the single encapsulating unit through the cross-holes to the helical grooves and subsequently to the annular passage for extrusion through the annular extrusion orifice as a multi-layer film in which the layers are inclined to and extend to the opposite surfaces of said film.

10 Claims, 5 Drawing Sheets

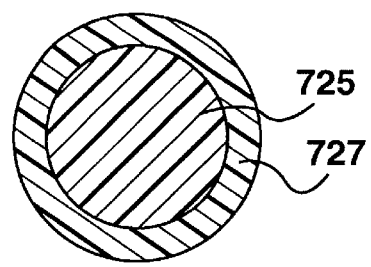
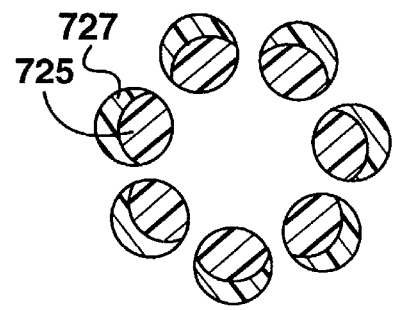
FIG. 3  FIG. 4
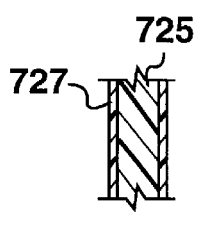
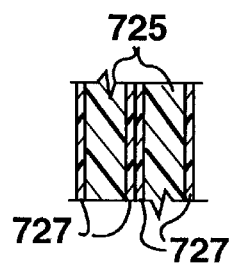
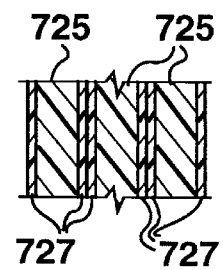
FIG. 5  FIG. 6  FIG. 7
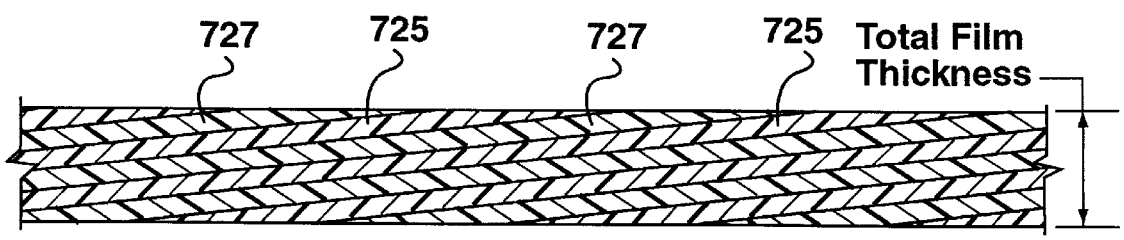
FIG. 8

METHOD OF EXTRUDING PLASTIC MATERIAL IN MULTI-LAYER TUBULAR FORM

RELATED APPLICATION

This application is a continuation-in-part of Application No. 09/082,477 filed May 21, 1998, now U.S. Pat. No. 6,116,885 issued Sep. 12, 2000.

FIELD OF INVENTION

This invention relates to methods of extruding plastic material in multi-layer tubular form.

BACKGROUND OF INVENTION

Multi-layer plastic films are becoming in more demand for a variety of commercial uses. The various layers of a multilayer plastic film are selected to provide the film with required properties, for example with respect to strength, moisture impermeability and oxygen impermeability. In view of the increasing commercial demand for such films, improved methods for their production are required.

It s therefore an object of the invention to provide an improved method for producing multilayer plastic film.

SUMMARY OF THE INVENTION

According to the one aspect of the invention, a method of extruding plastic material in multi-layer tubular film includes providing an extrusion die having a first body member and a second body member surrounding the first body member and forming an annul passage therebetween which communicates with an annular extrusion orifice, said body members having a series of helical grooves extending around the die and each commencing at a separate location, said separate locations being spaced around a lower portion of the first body member, a single encapsulating unit for providing a flow of encapsulated plastic material comprising a first plastic material surrounded by a second plastic material at an outlet thereof, said first body member having a series of cross-holes extending from said encapsulating unit output and each communicating with a respective separate location, and feeding encapsulated plastic material from the outlet of the single encapsulating unit through the cross-holes to the helical grooves and subsequently to the annular passage for extrusion through the annular extrusion orifice as a multi-layer film in which the layers are inclined to and extend to the opposite surfaces of said film.

Preferably, each helical groove extends around the inner body member of the extrusion die for at least two cross-holes and advantageously for at least 360°.

A third plastic material may be supplied to surround the encapsulated plastic material and produce a multi-layer plastic film in which the layers are inclined to and extend to the opposite surfaces of said film.

A further plastic material may be supplied to the inside and/or outside of the multi-layer plastic film before extrusion through the annular extrusion orifice to produce a multi-layer plastic film in which the layers are inclined to and extend to the outer surfaces thereof and at least one of said outer surfaces is covered by a layer of said further plastic material.

According to another aspect of the invention, an annular extrusion die for extruding plastic material in multi-layer tubular form has a first body member and a second body member surrounding the first body member and forming an annular passage therebetween which communicates with an annular extrusion orifice, said body members having a series of helical grooves extending around the die and each commencing at a separate location, said separate locations being spaced around a lower portion of the body member, and a single encapsulating unit for providing a flow of encapsulated plastic material comprising a first plastic material surrounded by a second plastic material at an outlet thereof, said first body member having a series of cross holes extending from said encapsulating unit output and each communicating with a respective separate location whereby the encapsulating unit supplies encapsulated plastic film through the outlet and the cross holes to the helical grooves and subsequently to the annular passage for extrusion through the annular extrusion orifice as a multi-layer tubular film in which the layers are inclined to and extend to the opposite surfaces of said film.

According to a still further aspect of the invention, a multi-layer plastic film has parallel opposite outer surfaces in which the layers are inclined to and extend to said outer surfaces. The plastic film may also include an outer layer of plastic material covering one or both outer surfaces.

DESCRIPTION OF THE DRAWINGS

Embodiments of the present invention will now be described, by way of example, with reference to the accompanying drawings, of which:

FIG. 3 is a cross-sectional view of the encapsulated plastic material at the outlet of the encapsulating unit, FIG. 4 is a diagrammatic cross-sectional view of partially encapsulated material in the eight cross-holes, FIG. 5 is a cross-sectional side view of the multilayer film in the annular passage taken along the line 5—5 of FIG. 1, FIG. 6 is a similar view but taken along the lines 6—6 of FIG. 1, FIG. 7 is a similar view but taken along the lines 7—7 of FIG. 1, FIG. 8 is a cross-sectional plan view of the multi-layer film in the annular passage taken along the line 8—8 of FIG. 1.

DESCRIPTION OF PREFERRED EMBODIMENTS

Figure 1:
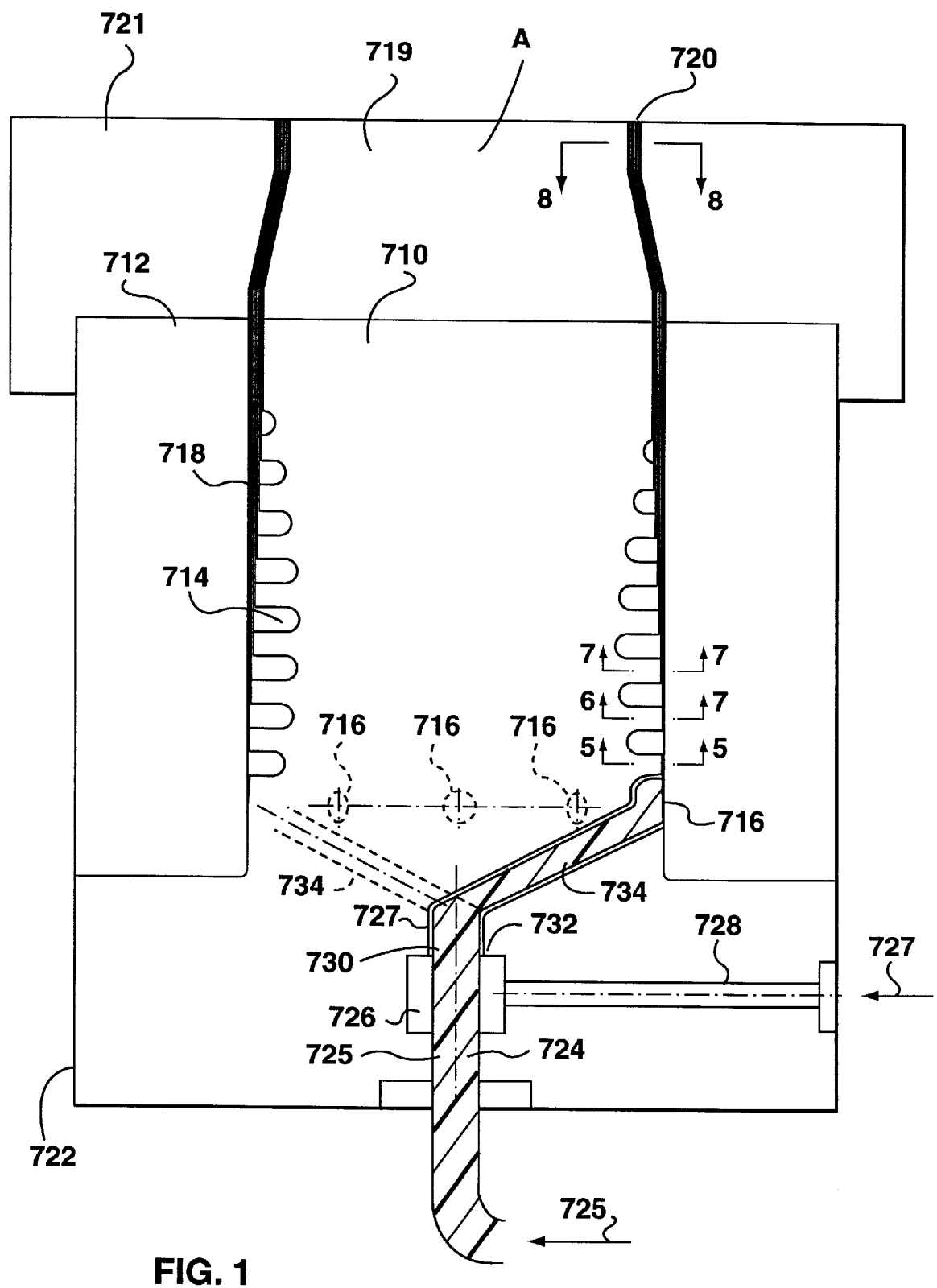
FIG. 1 is a diagrammatic side view of an annular extrusion die in accordance with one embodiment of the invention.
Figure 2:
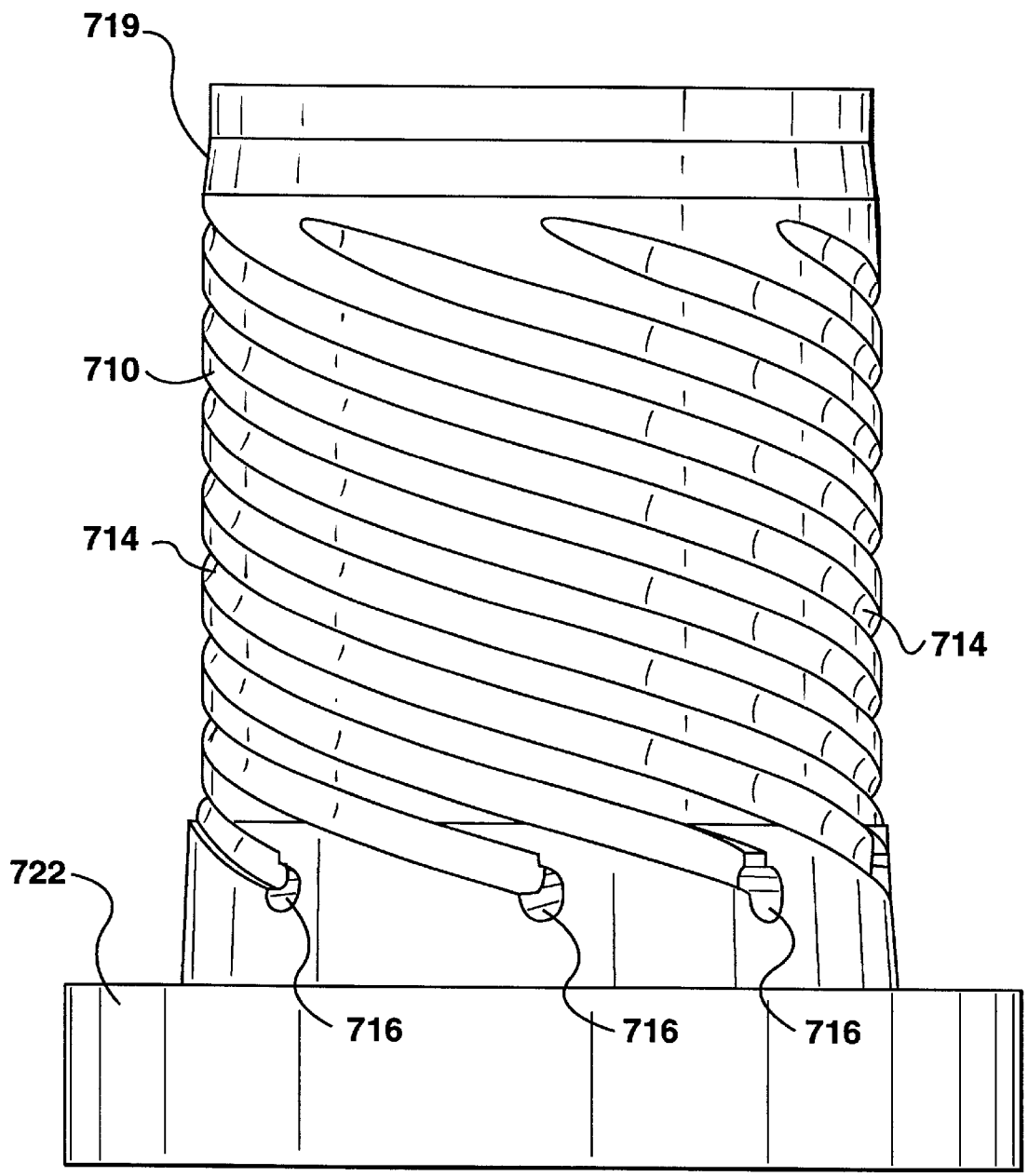
FIG. 2 is a side view of the inner body member of the annular extrusion die.

Referring first to FIGS. 1 to 8 of the drawings, an annular extrusion die has an inner die body member 710 and an outer die body member 712 surrounding inner body member 710. The inner body member 710 has eight helical grooves 714 each extending for slightly more than 360° around the inner body member 710. Each helical groove 714 commences at a separate location 716, the separate locations 716 being equally-angularly spaced around the inner body member 710. Thus, each helical groove 714 extends around the inner body member 710 for slightly more than 8 locations 716. The inner and outer body members 710, 712 form an annular passage 718 therebetween with which the helical grooves 714 are in communication and which leads to an annular extrusion orifice 720. The extrusion orifice 720 is actually formed by inner and outer lip members 719,721 mounted on top of the inner and outer body members 710, 712 in known manner.

The inner and outer body members 710, 712 are mounted on a base member 722 which has a first passage 724 for a first plastic material 725 extending upwardly from the bottom of the base member 722 to an encapsulating unit 726. A second passage 728 for a second plastic material 727 extends radially inwardly from the side of the base member 722 to the encapsulating unit 726. Encapsulating unit 726 produces a flow 730 of encapsulated plastic material comprising the first plastic material surrounded by the second plastic material at an outlet 732 thereof.

The inner body member 710 also has eight cross-holes 734 which extend from the encapsulating unit outlet 732, with each cross-hole 734 communicating with a respective separate location 716. The encapsulating unit 726 supplies encapsulated plastic material through the cross-holes 734 to the helical grooves 714 and subsequently to the annular if passage 718 for extrusion through extrusion orifice 720 as a multi-layer tubular film.

As shown in FIGS. 3 and 4, complete encapsulation of the first plastic material 725 is broken when the material flows from the encapsulating unit 726 into the eight cross-holes 734, and multilayer plastic material is formed as the two plastic materials proceed along the passage 718, as can be seen from FIGS. 5, 6 and 7.

The sandwich type construction of the resultant multi-layer film is shown in FIG. 8. Alternating layers of the first and second plastic material 725,727 are inclined to the surfaces of the film so that each layer extends to both surfaces thereof.

A combination of a relatively rigid plastic material (such as HDPE or PP) with an elastomeric material (such as LLDPE, EVA or EPT) may be provided to produce a multilayer film with improved properties such as tear strength, dart impact, seal ability, tensile strength and stiffness. The plastic materials may be of different colours to produce a decorative effect.

Figure 9:
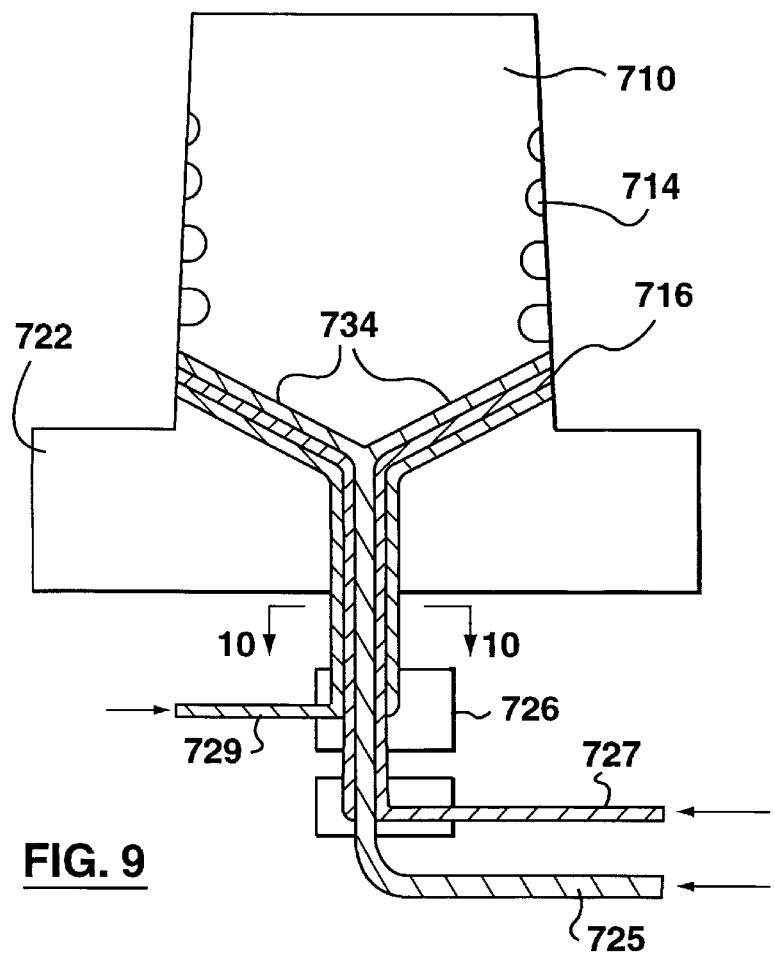
FIG. 9 is a diagrammatic sectional view of the inner body member of an extrusion die in accordance with another embodiment of the invention.
Figure 10:
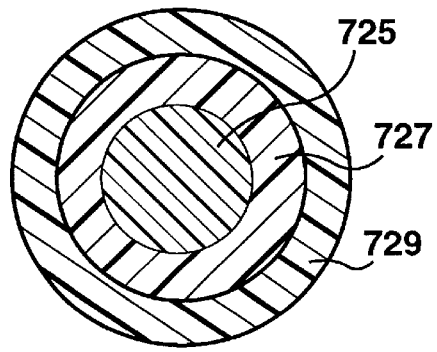
FIG. 10 is a sectional view of the encapsulated plastic material taken along the line 10—10 of FIG. 9.
Figure 11:
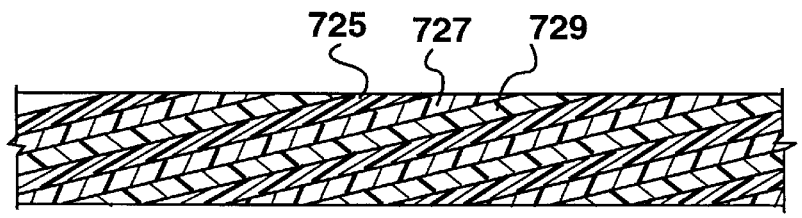
FIG. 11 is a cross-sectional plan view similar to FIG. 8 but showing multi-layer film produced by the extrusion die of FIGS. 9 and 10.

As shown in FIGS. 9 and 10, the encapsulating unit 726 may double encapsulate the first plastic material 725, i.e. with the second plastic material 727 and with a third plastic material 729, thereby producing a film as shown in FIG. 11.

Figure 12:
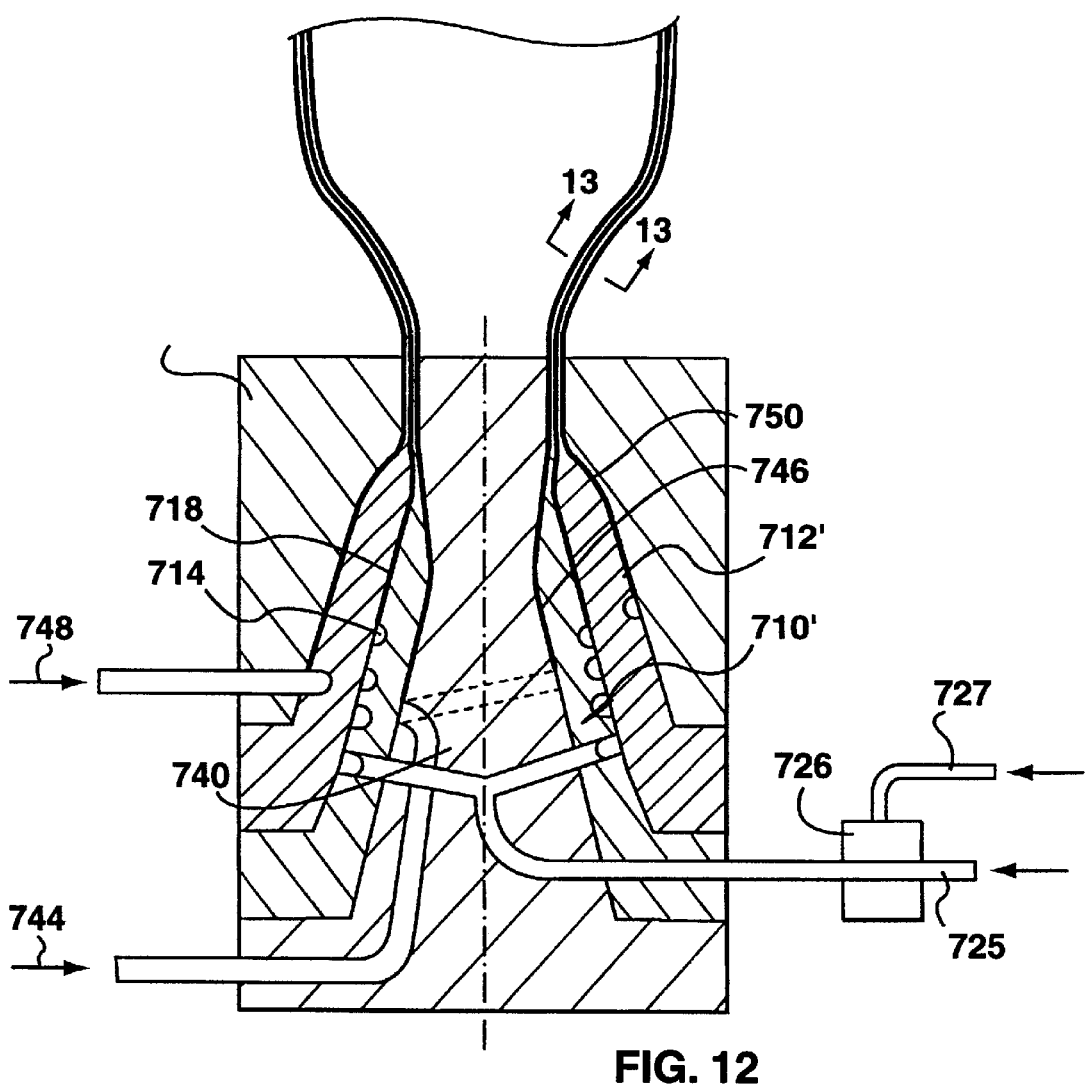
FIG. 12 is a diagrammatic sectional side view of an extrusion die in accordance with a further embodiment.
Figure 13:
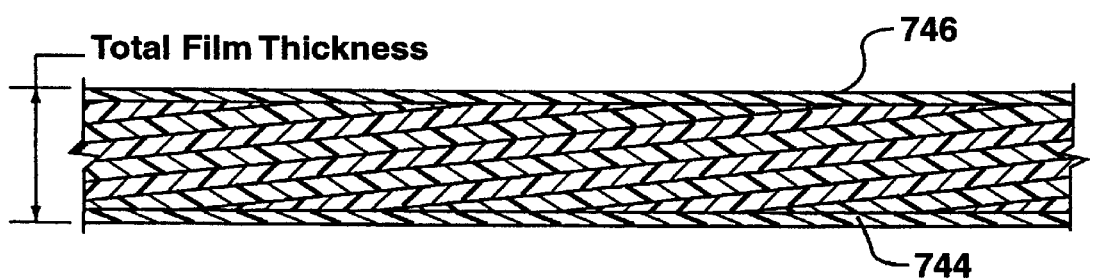
FIG. 13 is a cross-sectional plan view of the multi-layer film taken along the line 13—13 of FIG. 12.

Also, as shown in FIG. 12, inner body member 710' and outer body member 712' may be of annular frusto-conical shape and be part of a stacked die which has a central body member 740 and an external body member 742. A further plastic material 744 is supplied to a passage 746 between the inner body member 710' and the central body member 740, and a second further plastic material 748 is supplied to a passage 750 between the outer body member 712' and the external body member 742, with all plastic materials being extruded as a multilayer plastic film through extrusion orifice 720. The film produced is shown in FIG. 13, and consists of the film shown in FIG. 8 with the addition of outer layers 744, 746 which further improve the impact resistance of the film.

From the above description of preferred embodiments, a person skilled in the art will readily appreciate that the present invention enables improved multi-layer tubular plastic film to be produced inexpensively. The number of layers in the film will of course depend on the number of helical grooves and cross-holes, and on the extent to which each helical groove extends around the inner body member. With the present invention, it is possible to produce multi-layer plastic film with from about two to about thirty layers.

Other embodiments of the invention will be readily apparent to a person skilled in the art from the foregoing description, the scope of the invention being defined in the appended claims.

What is claimed is:

1. A method of extruding plastic material in multi-layer form including: providing an extrusion die having a first body member and a second body member surrounding the first body member and forming an annular passage therebetween which communicates with an annular extrusion orifice, said body members having a series of helical grooves extending around the die and each commencing at a separate location, said separate locations being spaced around a lower portion of the first body member, a single encapsulating unit for providing a flow of encapsulated plastic material comprising a first plastic material surrounded by a second plastic material at an outlet thereof, said first body member having a series of cross-holes extending from said outlet and each communicating with a respective separate location, and feeding encapsulated plastic material from the outlet of the single encapsulating unit through the cross-holes to the helical grooves and subsequently to the annular passage for extrusion through the annular extrusion orifice as a multi-layer film in which the layers are inclined to and extend to the opposite surfaces of said film.

2. A method according to claim 1 wherein each helical groove extends around the first body member of the extrusion die for at least two cross-holes.

3. A method according to claim 2 wherein each helical groove extends around the first body member for at least 360°.

4. A method according to claim 1 including supplying a third plastic material to surround the encapsulated plastic material and produce a multi-layer plastic film in which the layers are inclined to and extend to the opposite surfaces of said film.

5. A method according to claim 1 including supplying a further plastic material to the inside and/or outside of the multi-layer plastic film before extrusion through the annular extrusion orifice to produce a multi-layer plastic film in which the layers are inclined to and extend to the outer surfaces thereof and at least one of said outer surfaces is covered by a layer of said further plastic material.

6. An annular extrusion die for extruding plastic material in multi-layer tubular film, said extrusion die having a first body member and a second body member surrounding the first body member and forming an annular passage therebetween which communicates with an annular extrusion orifice, said body members having a series of helical grooves extending around the die and each commencing at a separate location, said separate locations being spaced around a lower portion of the first body member, and a single encapsulating unit for providing a flow of encapsulated plastic material comprising a first plastic material surrounded by a second plastic material at an outlet thereof, said first body member having a series of cross holes extending from said outlet and each communicating with a respective separate location whereby the encapsulating unit supplies encapsulated plastic film through the outlet and the cross holes to the helical grooves and subsequently to the annular passage for extrusion through the annular extrusion orifice as a multi-layer tubular film in which the layers are inclined to and extend to the opposite surfaces of said film.

7. An annular extrusion die according to claim 6 wherein each helical groove extends around the first body member for at least two cross holes.

8. An annular extrusion die according to claim 7 wherein each helical groove extends around the first body member for at least 360°.

9. An annular extrusion die according to claim 6 including means for supplying a third plastic material to surround the encapsulated plastic material and produce a multi-layer plastic film in which the layers are inclined to and extend to opposite surfaces of said film.

10. An annular extrusion die according to claim 6 including means for supplying a further plastic material to the inside and/or outside of the multi-layer plastic film before extrusion through the annular extrusion orifice to produce a multi-layer plastic film in which the layers are inclined to and extend to the outer surfaces thereof and at least one of the outer surfaces is covered by a layer of said further plastic material.

* * * * *